(12) United States Patent
Sperry, III

(10) Patent No.: US 11,931,693 B2
(45) Date of Patent: *Mar. 19, 2024

(54) CARBON DIOXIDE-CAPTURING CEMENT COMPOSITIONS AND RELATED METHODS

(71) Applicant: Carbon Limit Co., Boca Raton, FL (US)

(72) Inventor: Leonard Timothy Sperry, III, Highland Beach, FL (US)

(73) Assignee: Carbon Limit Co., Boca Raton, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,667

(22) Filed: Sep. 23, 2022

(65) Prior Publication Data

US 2023/0271135 A1 Aug. 31, 2023

Related U.S. Application Data

(63) Continuation of application No. 17/894,990, filed on Aug. 24, 2022.

(60) Provisional application No. 63/314,110, filed on Feb. 25, 2022.

(51) Int. Cl.
  *B01D 53/62* (2006.01)
  *B01D 53/81* (2006.01)
  (Continued)

(52) U.S. Cl.
  CPC ............. *B01D 53/62* (2013.01); *B01D 53/81* (2013.01); *B01D 53/82* (2013.01); *C04B 12/005* (2013.01); *C04B 14/047* (2013.01); *C04B 14/06* (2013.01); *C04B 14/14* (2013.01); *C04B 14/26* (2013.01); *C04B 14/30* (2013.01); *C04B 24/00* (2013.01); *C04B 28/04* (2013.01); *C04B 28/30* (2013.01); *C04B 40/0231* (2013.01); *B01D 2253/108* (2013.01); *B01D 2253/1124* (2013.01); *B01D 2257/504* (2013.01); *B01D 2258/06* (2013.01); *C04B 2103/0001* (2013.01); *C04B 2103/0078* (2013.01); *C04B 2111/00017* (2013.01)

(58) Field of Classification Search
None
See application file for complete search history.

(56) References Cited

U.S. PATENT DOCUMENTS 4,065,544 A * 12/1977 Hamling ................. C04B 35/48
                                                              423/625
8,603,424 B2    12/2013 Constantz et al.
(Continued)

FOREIGN PATENT DOCUMENTS

| KR | 20140148001 | * 12/2014 |
| KR | 102150030 | * 9/2020 |
| WO | WO 2012/079173 A1 | 6/2012 |

OTHER PUBLICATIONS

Siriruang, Chaichan et al. "CO2 capture using fly ash from coal fired power plant . . . ". Journal of Environmental Management. 170. 70-78 (2016). (Year: 2016).*

(Continued)

*Primary Examiner* — Sheng H Davis
(74) *Attorney, Agent, or Firm* — Wolf, Greenfield & Sacks, P.C.

(57) ABSTRACT

Cement compositions that can capture carbon dioxide and related methods are generally described.

13 Claims, 12 Drawing Sheets

(51) Int. Cl.
*B01D 53/82* (2006.01)
*C04B 12/00* (2006.01)
*C04B 14/04* (2006.01)
*C04B 14/06* (2006.01)
*C04B 14/14* (2006.01)
*C04B 14/26* (2006.01)
*C04B 14/30* (2006.01)
*C04B 24/00* (2006.01)
*C04B 28/04* (2006.01)
*C04B 28/30* (2006.01)
*C04B 40/02* (2006.01)
*C04B 103/00* (2006.01)
*C04B 111/00* (2006.01)

(56) References Cited

U.S. PATENT DOCUMENTS

| | | | | |
|---|---|---|---|---|
| 2003/0047119 | A1* | 3/2003 | Hemmings | C04B 7/12 106/713 |
| 2011/0277670 | A1* | 11/2011 | Self | B01D 61/027 210/768 |
| 2017/0267583 | A1* | 9/2017 | Garrison | C04B 28/021 |
| 2018/0105464 | A1* | 4/2018 | Waters | C04B 28/24 |
| 2021/0221694 | A1 | 7/2021 | Sperry, III | |

OTHER PUBLICATIONS

Xiong, Luchang et al. "Fly ash Particle size . . . ". Hindawai. Advances in Polymer Technology. 2019. (Year: 2019).*

[No Author Listed], Cement and Concrete Combined With Nanotechnology May Hold Key To Reducing Greenhouse Gases and Climate Change. AZoNano. Mar. 5, 2007. https://www.azonano.com/article.aspx?ArticleID=1873 [last accessed Nov. 2, 2022].

Chandler, MIT engineers develop a new way to remove carbon dioxide from air. MIT News. Oct. 24, 2019. https://news.mit.edu/2019/mit-engineers-develop-new-way-remove-carbon-dioxide-air-1025 [last accessed Nov. 2, 2022].

Hahn, "We're taking CO2 out of the system" says carbon-capturing concrete maker Carbicrete. De Zeen. Jun. 15, 2021. https://www.dezeen.com/2021/06/15/carbon-capturing-concrete-carbicrete/ [last accessed Nov. 2, 2022].

Irfan, New, Reusable Materials Could Pull CO2 Straight from Air. Scientific American. Climate Wire. Jan. 6, 2012. https://www.scientificamerican.com/article/new-reusable-materials-pull-co2-from-air/# [last accessed Nov. 2, 2022].

Kumar et al., The role of nanotechnology on post-combustion CO2 absorption in process industries. Int J Low Carbon Technol. Mar. 16, 2020;15(3):361-7.

Stashwick, With Carbon Capture, Concrete Could One Day Be A Carbon Sink. National Resources Defense Council. May 13, 2021. https://www.nrdc.org/experts/sasha-stashwick/carbon-capture-concrete-could-one-day-be-carbon-sink [last accessed Nov. 2, 2022].

International Search Report and Written Opinion for International Application No. PCT/US2023/013853 dated May 19, 2023.

Moro, Influence of nano-TiO2 addition on the environmental performance of cementitious composites: A holistic approach. Dissertation. Purdue University Graduate School. Dec. 2021:47 pages.

Qian et al., Carbon dioxide as an admixture for better performance of OPC-based concrete. J CO2 Util. May 2018;25:31-8.

\* cited by examiner

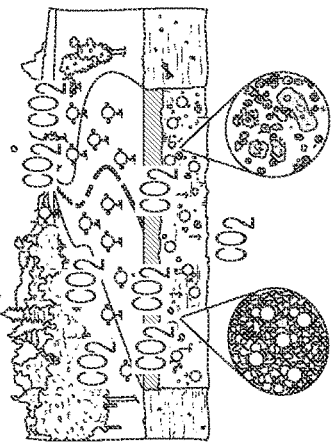
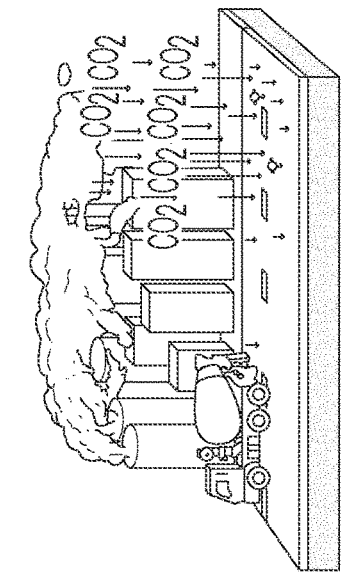
FIG. 2

| Sample | Description | CO2 Gain (%) | |
|---|---|---|---|
| 13688.1 | Formulation 1 CARBON LIMIT CONCRETE - 3 Day Break- | 1.94% | @ |
| 13688.2 | Formulation 2 CARBON LIMIT CONCRETE - 3 Day Break | 1.92% | $ |
| 13688.3 | Formulation 1 & 2 (control)- 3 Day Break | 0.71% | |
| 13688.4 | Formulation 1 CARBON LIMIT CONCRETE - 7 Day Break | 3.29% | @ |
| 13688.5 | Formulation 2 CARBON LIMIT CONCRETE - 7 Day Break | 1.45% | $ |
| 13688.6 | Formulation 1 & 2 (control)- 7 Day Break | 0.33% | |
| 13688.7 | Formulation 3 CARBON LIMIT CONCRETE - 3 Day Break | 0.34% | # |
| 13688.8 | Formulation 3 (control)- 3 Day Break | 0.24% | |
| 13688.9 | Formulation 1 CARBON LIMIT CONCRETE - 28 Day Break | 1.63% | @ |
| 13688.10 | Formulation 2 CARBON LIMIT CONCRETE - 28 Day Break | 1.39% | $ |
| 13688.11 | Formulation 1 & 2 (control)- 28 Day Break | 0.45% | |
| 13688.12 | Formulation 3 CARBON LIMIT CONCRETE - 7 Day Break+ | 0.26% | # |
| 13688.13 | Formulation 3 (control)- 7 Day Break | 0.19% | |
| 13688.14 | Formulation 4 CARBON LIMIT CONCRETE - 3 Day Break | 0.23% | % |
| 13688.15 | Formulation 4 (control)- 3 Day Break | 0.16% | |

FIG. 5

CARBON DIOXIDE-CAPTURING CEMENT COMPOSITIONS AND RELATED METHODS

RELATED APPLICATIONS

This application is a continuation of U.S. application Ser. No. 17/894,990, filed Aug. 24, 2022, and entitled "Carbon Dioxide-Capturing Cement Compositions and Related Methods," which claims priority under 35 U.S.C. § 119(e) to U.S. Provisional Application No. 63/314,110, filed Feb. 25, 2022, and entitled "Negative Emission Technology Cement," each of which is incorporated herein by reference in its entirety for all purposes.

TECHNICAL FIELD

Cement compositions that can capture carbon dioxide and related methods are generally described.

BACKGROUND

Carbon dioxide emissions continue to make worse the problems of global warming and other negative environmental impacts. Some challenges include extreme weather events and health hazards caused by increase carbon dioxide levels in the atmosphere and these challenges become more prevalent every day. One way to reduce carbon dioxide emissions is by utilizing renewable energy sources that are climate friendly, instead of the conventional fuel burning energy sources. Unfortunately, the adaptation of these technologies and the advancement of these technologies have not increased at a fast enough rate to reduce the total amount of carbon dioxide within the atmosphere. Accordingly, improved techniques for mitigating carbon dioxide levels are desired.

SUMMARY

Cement compositions that can capture carbon dioxide are generally described. In some embodiments, the cement composition may replace conventional cement compositions in concrete. The subject matter of the present disclosure involves, in some cases, interrelated products, alternative solutions to a particular problem, and/or a plurality of different uses of one or more systems and/or articles.

In one aspect, a cement composition is described, the composition comprising a first material comprising a pozzolanic material; a second material comprising silica and/or carbonate compound; and a metal oxide.

In another aspect, a cement composition is described, the composition comprising a first material comprising a porous inorganic material; a second material comprising silica; and a third material comprising a metal oxide.

In another aspect, a cement composition is described, the composition comprising a first material comprising a porous inorganic material; a second material comprising a carbonate compound; and a metal oxide.

In yet another aspect, a cement composition is described, the composition comprising a first material comprising a porous material; a second material comprising a silica and/or a carbonate compound.

In another aspect, a method for preparing a concrete mixture, the method comprising combining a first plurality of particles comprising a first material comprising a porous inorganic material with a second plurality of particles comprising a second material comprises silica or a carbonate compound, wherein the first plurality of particles and/or the second plurality of particles has an average particle size of less than or equal to 100 microns.

In yet another aspect, a method of capturing carbon dioxide is described, the method comprising capturing carbon dioxide from an ambient environment using a material comprising a cement composition, the cement composition comprising a first material comprising a porous inorganic material; a second material comprising silica and/or a carbonate compound; and a third material comprising a metal oxide. In some embodiments, the material is or comprises concrete.

Other advantages and novel features of the present disclosure will become apparent from the following detailed description of various non-limiting embodiments of the invention when considered in conjunction with the accompanying figures. In cases where the present specification and a document incorporated by reference include conflicting and/or inconsistent disclosure, the present specification shall control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures:

FIG. 2 is a diagram depicting carbon dioxide, according to some embodiments;

FIG. 5 is a table that depicts that the maximum carbon dioxide absorption of various cementitious formulations after 3 days, 7 days, and 28 days, according to some embodiments;

DETAILED DESCRIPTION

Figure 1:
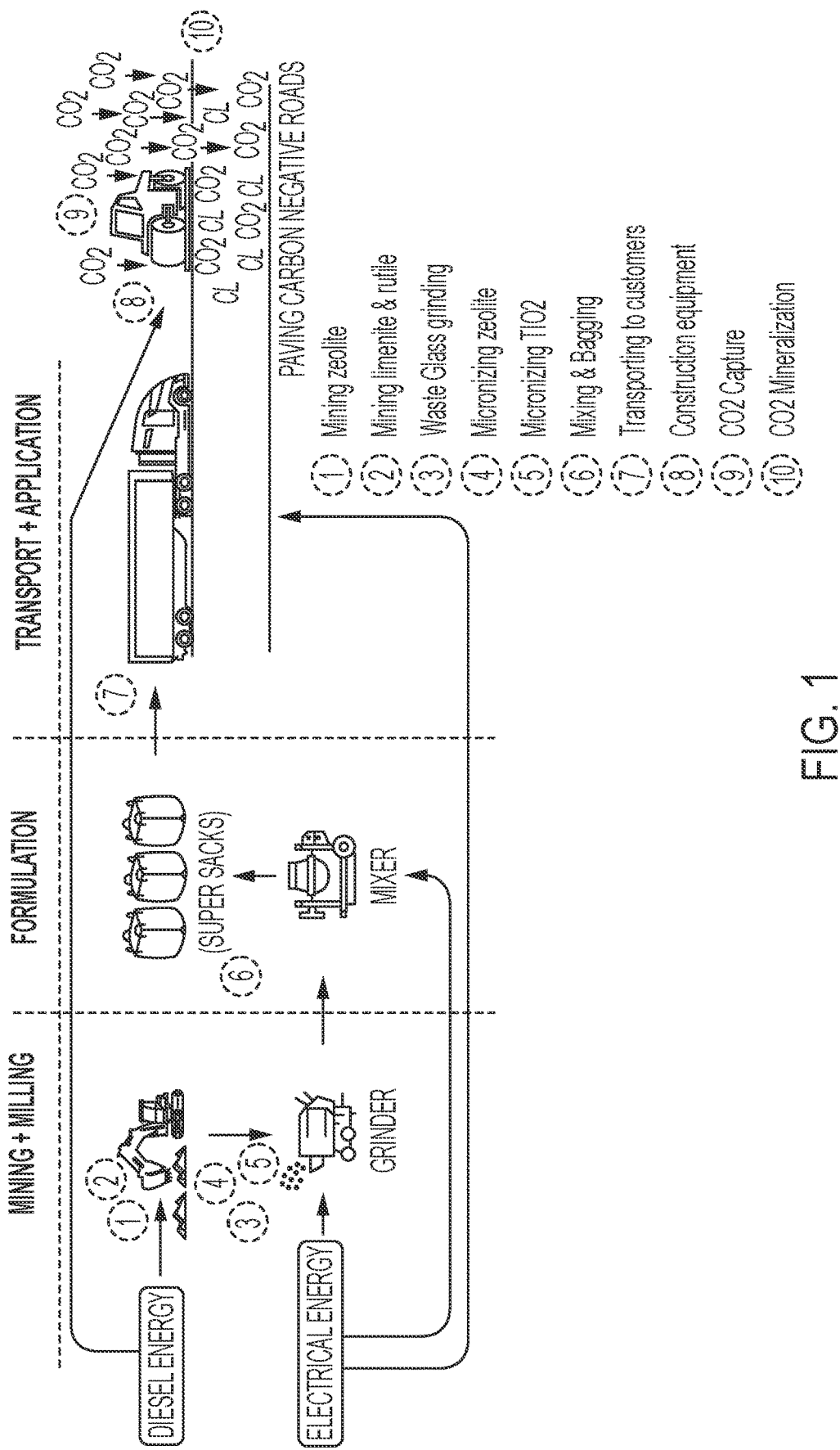
FIG. 1 is a schematic diagram illustrating a process for preparing and transporting concrete, according to some embodiments.

The present disclosure describes compositions that can capture carbon dioxide from an ambient environment, such the surrounding atmosphere or air. This disclosure also describes methods for capturing carbon dioxide using cement and/or concrete compositions. The inventive compositions may comprise materials that are capable of capturing carbon dioxide from the atmosphere and may also result in incorporating the carbon dioxide into the material itself (e.g., via mineralization of the carbon dioxide into one or more materials of the composition, such as a carbonate-containing compound). These compositions can form concrete, which can be incorporated into numerous structures, including roads, bridges, streets, buildings, and the like, resulting in structures that can sequester carbon dioxide directly from the atmosphere and thus reduce the impact of carbon dioxide in the environment.

The inventive compositions described herein may supplement or, at least partially, replace conventional concrete or components that make up concrete (e.g., cement, concrete aggregates). Conventional concrete preparations include mixing cement, mineral aggregates, and water, forming the mixture as desired, and allowing the mixture to harden into concrete. The uptake of carbon dioxide by these conventional concretes is minimal, if any, making them ineffective for carbon capture. Furthermore, manufacturing conventional concretes also release carbon dioxide, further limiting conventional concretes as carbon-capturing technologies.

It has been discovered as described by the present disclosure that concrete can be prepared that sequesters carbon dioxide from the surrounding environment. The compositions and methods described herein can result in concrete compositions that significantly reduce carbon dioxide from its surroundings and may also result in less carbon dioxide emission during the concrete manufacturing process. Advantageously, the cement and/or concrete compositions may become stronger (e.g., increased mechanical strength) as the materials of the compositions capture carbon dioxide and trap (e.g., mineralize) it (e.g., as a carbonate-containing compound) within the concrete. As is described in more detail below, the ability to produce carbon-capturing concrete can turn sidewalks, buildings, and other structures into carbon negative sinks for sequestering carbon dioxide from the atmosphere. As another advantage, the compositions, and methods described herein may maintain or increase the structural integrity and/or strength of cement when compared to other certain existing concrete compositions. This is because the compositions described herein may increase in strength as they capture carbon dioxide from the ambient surroundings. Other advantages are described below.

As is described in more detail below and elsewhere herein, the cement compositions may comprise a mixture of materials (e.g., a first material, a second material, a third material). In some cases, the mixture of materials can replace conventional cements (e.g., portland cement, original portland cement) in concrete compositions, resulting in a concrete that can sequester carbon dioxide from the surrounding environment. In the carbon dioxide-capturing compositions (e.g., cements, concretes) described here can capture carbon dioxide naturally captured by conventional concretes, in addition to more carbon dioxide beyond the capacity of conventional concretes.

As noted above, the cement compositions include a first material. In some embodiments, the first material comprises one or more zeolites. In some embodiments, the first material comprises basalt. In some embodiments, the first material comprises a pozzolanic material. In some embodiments, the first material comprises a zeolite, a basalt, and/or a pozzolanic material. Details regarding these materials and other materials are described in more detail below.

The first material may be present in a cement and/or concrete composition at a particular amount. For example, in some embodiments, a weight percentage of the first material within the cement and/or concrete composition is greater than or equal to 5%, greater than or equal to 10%, greater than or equal to 20%, greater than or equal to 30%, greater than or equal to 40%, greater than or equal to 50%, greater than or equal to 60%, greater than or equal to 70%, greater than or equal to 80%, or greater than or equal to 90%. In some embodiments, the weight percentage of the first material within the cement and/or concrete composition is less than or equal to 90%, less than or equal to 80%, less than or equal to 70%, less than or equal to 60%, less than or equal to 50%, less than or equal to 40%, less than or equal to 30%, less than or equal to 20%, less than or equal to 10%, or less than or equal to 5%. Combinations of the above-referenced ranges are also possible (e.g., greater than or equal to 5% and less than or equal to 80%). Other ranges are possible. The remaining percentage may be another material (e.g., a second material, a third material).

As mentioned above, in some embodiments, the first material may comprise one or more zeolites. The one or more zeolites can each be a porous zeolite with the same or different composition. In some such embodiments, the zeolites comprise a honeycomb-like lattice structure. In some embodiments, the zeolites are porous materials comprising aluminosilicates. In some embodiments, the zeolite comprises clinoptilolite. In some embodiments, the zeolite is a naturally occurring zeolite. In some embodiments, the zeolite is a synthetic zeolite. In some embodiments, the zeolites can capture or sequester carbon dioxide via molecular binding (e.g., absorption, absorption, non-covalent interactions, covalent interactions) within pores of the zeolite. In some such embodiments, upon binding to the zeolite, the carbon dioxide may be converted to a carbonate compound (e.g., calcium carbonate) via carbonization of the first material or another material (e.g., a second material, a third material) in the composition.

In some embodiments, one or more zeolites may comprise a particular amount of the first material and/or the cement composition. For example, in some embodiments, a weight percentage of zeolite is greater than or equal to 5%, greater than or equal to 10%, greater than or equal to 20%, greater than or equal to 30%, greater than or equal to 50%, greater than or equal to 60%, greater than or equal to 65%, greater than or equal to 70%, greater than or equal to 75%, greater than or equal to 80%, greater than or equal to 85%, or greater than or equal to 90%. In some embodiments, a weight percentage of zeolite is less than or equal to 90%, less than or equal to 85%, less than or equal to 80%, less than or equal to 75%, less than or equal to 70%, less than or equal to 65%, less than or equal to 60%, less than or equal to 50%, less than or equal to 30%, less than or equal to 20%, less than or equal to 10%, or less than or equal to 5%. Combinations of the above-referenced ranges are also possible (e.g., greater than or equal to 5% and less than or equal to 90%). Other ranges are possible. The remaining percentage, if any, may be another zeolite, another first material, and/or some other material (e.g., a second material, a third material).

As mentioned above, the zeolite may be a porous zeolite. The zeolite (or some other first material) may have a particular porosity. In some embodiments, the porosity of the zeolite (or some other first material) is greater than or equal to 20%, greater than or equal to 30%, greater than or equal to 50%, greater than or equal to 60%, greater than or equal to 70%, or greater than or equal to 80%. In some embodiments, the porosity of the zeolite (or some other first material) is less than or equal to 80%, less than or equal 70%, less than or equal to 60%, less than or equal to 50%, less than or equal to 30%, or less than or equal to 20%. Combinations of the above referenced ranges are also possible (e.g., greater than or equal to 20% and less than or equal to 80%). Other ranges are possible.

In some embodiments, the one or more zeolites (or some other first material) each have a particular average pore size. In some embodiments, the zeolite has an average pore diameter of less than 1,000 µm, less than 750 µm, less than 500 µm, less than 250 µm, less than 100 µm, less than 50 µm, less than 25 µm, less than 20 µm, less than 10 µm, less than 1 µm, less than 750 nm, less than or equal to 500 nm, less than or equal to 250 nm, less than or equal to 100 nm, or less than or equal to 50 nm. In some embodiments, the zeolite has an average pore diameter of greater than or equal to 50 nm, greater than or equal to 100 nm, greater than or equal to 200 nm, greater than or equal to 250 nm, greater than or equal to 500 nm, greater than or equal to 750 nm, greater than or equal to 1 µm, greater than or equal to 5 µm, greater than or equal to 10 µm, greater than or equal to 20 µm, greater than or equal to 25 µm, greater than or equal to 50 µm, greater than or equal to 100 µm, greater than or equal to 250 µm, greater than or equal to 500 µm, greater than or equal to 750 µm, or greater than or equal to 1,000 µm. Combinations of the foregoing ranges are also possible (e.g., greater than or equal to 50 nm and less than or equal to 1,000 µm). Other ranges are possible as this disclosure is not so limited.

As mentioned above, in some embodiments, the first material comprises a basalt. Basalts may comprise a fine-grained (e.g., grain sizes less than 1000 µm) rock formed from volcanic activity, which may also comprise a columnar structure. In some embodiments, basalts may comprise iron and/or magnesium compounds. In some embodiments, basalts comprise silica (e.g., $SiO_2$) and/or alkali metal oxides (e.g., $Na_2O$ and $K_2O$).

In some embodiments, the basalt may be present in the first material or the cement composition with a particular amount. For example, in some embodiments, a weight percentage of basalt within the first material and/or the cement composition is greater than or equal to 5%, greater than or equal to 10%, greater than or equal to 15%, greater than or equal to 20%, greater than or equal to 25%, greater than or equal to 30%, or greater than or equal to 35%. In some embodiments, the weight percentage of basalt within the first material and/or the cement composition is less than or equal to 35%, less than or equal to 30%, less than or equal to 25%, less than or equal to 20%, less than or equal to 15%, less than or equal to 10%, or less than or equal to 5%. Combinations of the above-referenced ranges are also possible (e.g., greater than or equal to 5% or less than or equal to 35%). Other ranges are possible. The remaining percent can be remaining first material (e.g., zeolite, basalt) and/or some other material of the composition (e.g., a second material, a third material).

In some embodiments, the first material comprises a pozzolanic material. Pozzolanic materials may comprise naturally derived materials and/or industrially produced material comprising a silicon-containing and/or aluminum-containing compounds that may react with calcium hydroxide when exposed to water. In some embodiments, the pozzolanic material comprises or is derived from volcanic ash. In some embodiments, the pozzolanic material comprises silicon-containing volcanic ash, fly ash, silica fume, metakaolin, slag, and/or vitrified calcium aluminosilicate. In some embodiments, the pozzolanic material may comprise diatomaceous earth, clays, rice hull ash, calcined fullers earth, calcined diatomite, uncalcined diatomite, zeolitic trass, and/or calcined clay. In some embodiments, the pozzolanic material comprises olivine, serpentine, basalts, wollastonite, calcium carbonate, and/or metal organic frameworks (MOFs). In some embodiments, the pozzolanic material comprises a mafic mineral (e.g., olivine, serpentine, wollastonite) and/or an ultramafic mineral.

The cement compositions may also comprise a second material. In some embodiments, the second material increases the mineralization capacity of carbon dioxide within the cement and/or concrete composition. The second material may comprise a variety of materials. For example, in some embodiments, the second material comprises waste glass. In some embodiments, the second material comprises silica. In some embodiments, the second material comprises carbonate-containing compounds, such as calcium carbonate. In some embodiments, the second material comprises waste glass, silica, and/or carbonate-containing compounds. Details regarding these materials are described below.

The second material may be present in a cement and/or concrete composition with a particular amount. For example, in some embodiments, a weight percentage of the second material within the cement and/or concrete composition is greater than or equal to 10%, greater than or equal to 15%, greater than or equal to 20%, greater than or equal to 25%, greater than or equal to 30%, greater than or equal to 35%, greater than or equal to 40%, or greater than or equal to 50%. In some embodiments, the weight percentage of the second material within the cement and/or concrete composition is less than or equal to 50%, less than or equal to 40%, less than or equal to 35%, less than or equal to 30%, less than or equal to 25%, less than or equal to 20%, less than or equal to 15%, or less than or equal to 10%. Combinations of the above-referenced ranges are also possible (e.g., greater than or equal to 10% and less than or equal to 50%). Other ranges are possible. The remaining percentage can be another material (e.g., a first material, a third material) as described elsewhere herein.

As mentioned above, in some embodiments, the second material comprises waste glass. Waste glass may comprise discarded glass from other processes (e.g., recycled glass from consumer outputs, disposed of glass from industrial and/or construction sites). In some embodiments, waste glass is an amorphous material comprising silica ($SiO_2$), calcium carbonate ($CaCO_3$), and/or sodium carbonate ($Na_2CO_3$). In some embodiments, waste glass is an amorphous material further comprising aluminum oxide, quicklime (CaO), magnesia (MgO), potassium oxide ($K_2O$), and/or sodium oxide ($Na_2O$). In some embodiments, waste glass comprises greater than or equal to 3%, greater than or equal to 6%, greater than or equal to 9%, greater than or equal to 12%, greater than or equal to 15%, greater than or equal to 18%, greater than or equal to 21%, greater than or equal to 24%, greater than or equal to 27%, or greater than or equal to 30% of the second material or of the cement and/or concrete composition. In some embodiments, waste glass comprises less than or equal to 30%, less than or equal to 27%, less than or equal to 24%, less than or equal to 21%, less than or equal to 18%, less than or equal to 15%, less than or equal to 12%, less than or equal to 9%, less than or equal to 6%, or less than or equal to 3%. Combinations of the above-referenced ranges are also possible. Other ranges are possible.

In some embodiments, the second material comprises a carbonate-containing compound. In some embodiments, the carbonate-containing compound comprises calcium carbonate ($CaCO_3$), sodium carbonate ($Na_2CO_3$), and/or potassium carbonate ($K_2CO_3$). In some embodiments, the calcium-containing compound comprises magnesium carbonate ($MgCO_3$).

Cement and/or concrete compositions may also comprise a third material. In some embodiments, the third material may alter the pore size of other materials in the mixture (e.g., the pore size of the first material, the pore size of the second material). Advantageously, the third material may also improve the overall compressive strength of the cement composition and/or the resulting concrete and may also reduce water loss (and/or shrinking as a result of water loss) of the cement composition and/or the resulting concrete. As is described in more detail below, the third material may comprise a variety of material. In some embodiments, the third material comprises a metal oxide, such as a transition metal oxide. In some such embodiments, the metal oxide comprises titanium dioxide ($TiO_2$). Additional non-limiting examples of metal oxides include zirconium oxide, hafnium oxide, zinc oxide, and/or iron oxide. Other metal oxides are possible as this disclosure is not so limited.

The third material may be present in a cement and/or concrete composition at a particular amount. For example, in some embodiments, a weight percentage of the third material within the cement and/or concrete composition is greater than or equal to 0.1%, greater than or equal to 0.5%, greater than or equal to 1%, greater than or equal to 2%, greater than or equal to 3%, greater than or equal to 4%, greater than or equal to 5%, or greater than or equal to 10%. In some embodiments, the weight percentage of the third material within the cement and/or concrete composition is less than or equal to 10%, less than or equal to 5%, less than or equal to 4%, less than or equal to 3%, less than or equal to 2%, less than or equal to 1%, less than or equal to 0.5%, or less than or equal to 0.1%. Combinations of the above-referenced ranges are also possible (e.g., greater than or equal to 0.1% and less than or equal to 10%). Other ranges are possible. The remaining percentage may be another material (e.g., a first material, a second material) as described elsewhere herein.

As mentioned above, in some embodiments, the third material comprises titanium dioxide. In some embodiments, titanium dioxide is crystalline and may promote the uptake of carbon dioxide. The diameter (e.g., the average diameter) of the titanium dioxide particles may be greater than or equal to 0.5 nm, greater than or equal to 1 nm, greater than or equal to 25 nm, greater than or equal to 50 nm, greater than or equal to 100 nm, greater than or equal to 250 nm, greater than or equal to 500 nm, greater than or equal to 1 μm, greater than or equal to 25 μm, greater than or equal to 100 μm, greater than or equal to 250 μm, or greater than or equal to 500 μm. In some embodiments, the diameter of the titanium dioxide particles is less than or equal to 500 μm, less than or equal to 250 μm, less than or equal to 100 μm, less than or equal to 25 μm, less than or equal to 1 μm, less than or equal to 500 nm, less than or equal to 250 nm, less than or equal to 100 nm, less than or equal to 50 nm, less than or equal to 25 nm, less than or equal to 1 nm, or less than or equal to 0.5 nm. Combinations of the above-referenced ranges are also possible (e.g., greater than or equal to 0.5 nm and less than or equal to 500 μm). Other ranges are possible.

Figure 11:
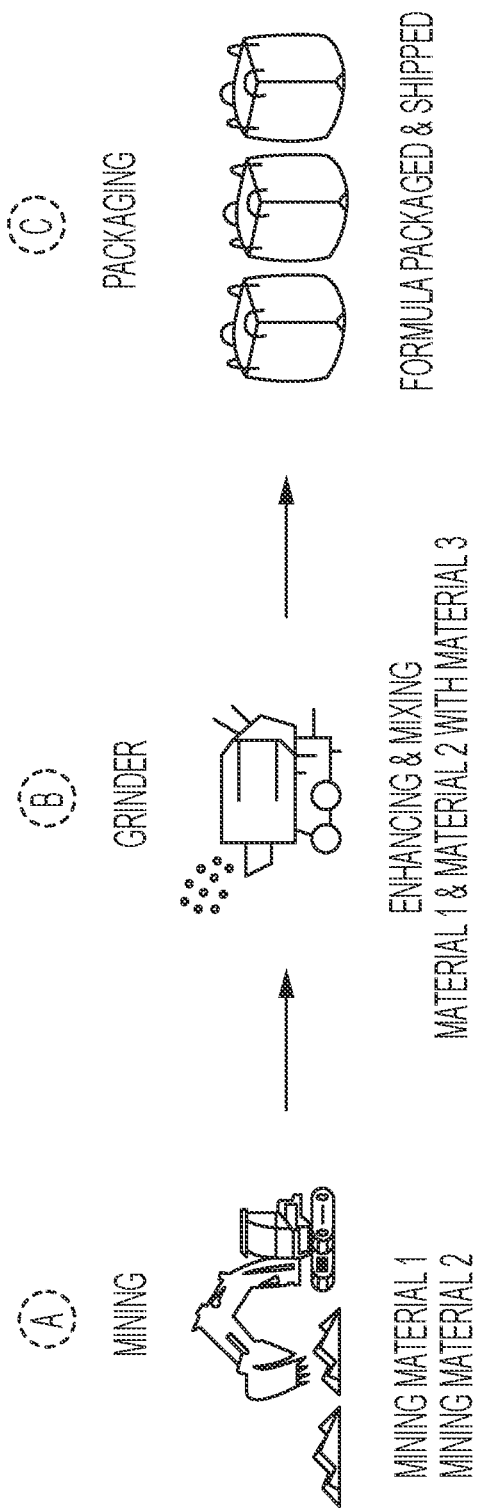
FIG. 11 is a schematic illustrating the mining of materials to packing of inventive cement compositions, according to some embodiments.

In some embodiments, any one of the first, the second, and/or the third material may be obtained from conventional mining processes or may be the waste of conventional mining processes. FIG. 11 illustrates a process of gathering materials to packaging.

The cement compositions can comprise a mixture of the first material(s) (and mixtures thereof), the second material, and/or the third material. As should be understood by persons skilled in the art, cement is used in production of concrete, and concrete compositions may comprise the same or different composition as the cement composition used to prepare the concrete composition. Accordingly, descriptions regarding cement compositions as described herein may also be applicable to the resulting concrete.

The cement compositions comprising a first material, a second material, and/or a third material (e.g., a first material and a second material, a first material and a second material and a third material) may be used to form concrete (e.g., concrete compositions, concrete mixtures). Accordingly, various embodiments are described in which concrete comprises a cement composition (e.g., comprising the first material, the second material, and the third material) along with another component, such as a concrete-forming material. Concreate-forming materials include pastes that can bind cement and/or concrete materials together to form solid concrete (e.g., after curing the concrete mixture). In some embodiments, concrete (e.g., a concrete composition, a concrete mixture) comprises a mixture of the first material, the second material and/or the third material. In some embodiments, the first material, the second material, and/or the third material is greater than or equal to 0.01 wt %, greater than or equal to 0.05 wt %, greater than or equal to 0.1 wt %, greater than or equal to 1 wt %, greater than or equal to 2 wt %, greater than or equal to 3 wt %, greater than or equal to 5 wt %, greater than or equal to 10 wt %, or greater than or equal to 15 wt % of the total weight of the concrete composition. In some embodiments, the first material, the second material and/or the third material is less than or equal to 15 wt %, less than or equal to 10 wt %, less than or equal to 5 wt %, less than or equal to 3 wt %, less than or equal to 2 wt %, less than or equal to 1 wt %, less than or equal to 0.1 wt %, less than or equal to 0.05 wt %, or less than or equal to 0.01 wt % of the total weight of the concrete composition. Combinations of the above-referenced ranges are also possible (e.g., greater than or equal to 0.01 wt % and less than or equal to 15 wt %). Other ranges are possible. The remaining balance for the total weight of the concrete composition may be another of the first material, the second material, and/or the third material, and/or one or more concrete-forming materials (e.g., concrete aggregates, paste, water).

In some embodiments, the cement composition (e.g., comprising a first material, a second material, and a third material) may comprise particles of a particular particle size. For example, in some embodiments, an average particle dimension (e.g., diameter) is less than or equal to 1000 μm, less than or equal to 750 µm, less than or equal to 500 µm, less than or equal to 250 µm, less than or equal to 100 µm, less than or equal to 50 µm, less than or equal to 20 µm, less than or equal to 10 µm, or less than or equal to 1 µm. In some embodiments, an average particle dimension is greater than or equal to 1 µm, greater than or equal to 20 µm, greater than or equal to 50 µm, greater than or equal to 100 µm, greater than or equal to 250 µm, greater than or equal to 500 µm, greater than or equal to 750 µm, or greater than or equal to 1,000 µm. Combinations of the above-reference ranges are also possible (e.g., greater than or equal to 1 µm and less than or equal to 1,000 µm). Other ranges are possible.

Figure 9:
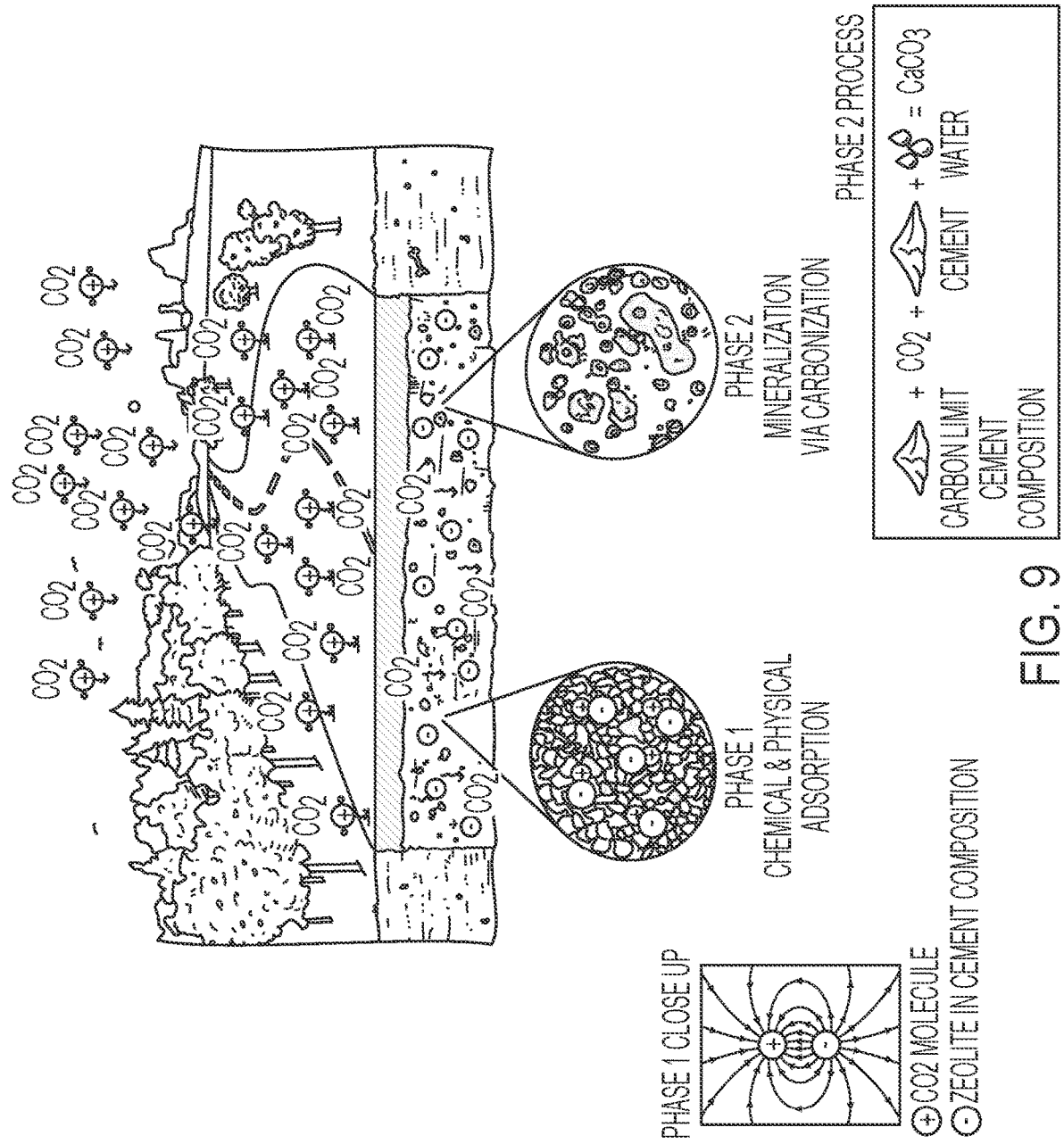
FIG. 9 is a schematic diagram illustrating the process $CO_2$ absorption into an inventive cement composition, followed by mineralization the carbon dioxide into a carbonate; according to some embodiments.

Without wishing to be bound by any particular theory, it is believed that the combination of materials can adsorb carbon dioxide. While carbon dioxide is, overall, a non-polar molecular, the two double-bonded oxygens in carbon oxide provides positive character to the carbon of the carbon dioxide. It is believed that a negatively charged (and/or partially negatively charged) species within the materials (e.g., the first material, the second material, and/or the third material), such as oxygen atoms within a zeolite and/or pozzolanic material may attract the positive character of the carbon of carbon dioxide, and may, in some embodiments, facilitate further reactions of the carbon dioxide, such as mineralization into a carbonate-containing compound. FIG. 9 is a schematic representation of such a process.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

FIG. 1 is a schematic illustration showing the gathering and processing of materials (e.g., a first material, a second material, a third material). As shown in the figure, the materials may be mined and further micronized such that the particle size of the materials is at or below a micron scale. The cement composition may then be mixed and transported, for example, to an end user. The end user may then construct materials from the cement, where the resulting cement and/or concrete can capture carbon dioxide from the ambient environment and mineralize the carbon dioxide directly into the concrete. Advantageously, the concrete may improve in physical properties, such as mechanical strength as it captures and mineralizes carbon dioxide from the surrounding environment.

In some embodiments, the method comprises incorporating (e.g., mixing) the first material and the second material. The first material and/or the second material may each comprise a plurality of particles (e.g., a plurality of particles of the first material, a plurality of particles of the second material) and incorporating may include grinding and mixing of the particles to below a certain particle dimension (e.g., less than or equal to 1000 microns). A variety of grinding techniques may be used. Non-limiting examples of grinding techniques including mortar and pestle and/or ball milling (including planetary ball milling). In some embodiments, grinding a material (e.g., a first material, a second material) may increase the ability of the material to capture carbon dioxide (e.g., making the material more reactive towards carbon dioxide). In some embodiments, grinding reduces the particle size (e.g., below 100 µm in average particle size). Advantageously, reducing the particle size of the material(s) (e.g., ball milling, planetary ball milling) increases the surface area of the material(s) so that the material(s) have more exposure to carbon dioxide. In some embodiments, grinding may increase the porosity of the material. In some embodiments, grinding may heat the material (e.g., by at least 1° C., by at least 5° C., by at least 10° C.). In some embodiments, a high energy ball mill/grinder reduces the particle size the first material, the second material, and/or the third material to less than or equal to 100 microns in average particle dimension. Advantageously, the adsorption surface area of the materials may be increased, increasing the ability to capture carbon dioxide. Additionally, and without wishing to be bound by any particular theory, high energy ball milling/grinding may result in local hot spots while grinding which may make amorphous (e.g., from a crystalline or crystalline state) at least portions of the first material, the second material and/or the third material, which may increase the absorption and/or reactivity towards carbon dioxide.

In some embodiments, the method comprises reducing in size the first material, the second material, and/or the third material to particles having an average diameter of less than or equal to 100 microns. The size reduction can be achieved via grinding, crushing, granulating, pulverizing, and/or other methods capable of reducing clinker or other cementitious products into a fine powder.

In some embodiments, the method comprises adding the mixture of the first material, the second material, and the third material to a concrete-forming composition to form a concrete mixture. The concrete mixture may further comprise concrete aggregates, and/or OPC. However, in some embodiments, the concrete mixture is free of portland cement or OPC. In some embodiments, a concrete composition comprises a cement composition as described elsewhere herein and further comprises one or more concrete-forming materials (e.g., concrete aggregates, paste, water).

In some embodiments, the method further comprises curing the concrete mixture by hydrating the mixture with water. Without wishing to be bound by any particular theory, it is believed that when the mixture is hydrated, calcium-silicate hydrate forms within the mixture which may result in an increase in strength.

In some embodiments, the method comprises capturing carbon dioxide with the mixture. Atmospheric carbon dioxide may be adsorbed, absorbed, trapped, and/or captured into the cured concrete mixture.

The cement composition can capture carbon dioxide a particular amount of carbon dioxide. By way of illustration and not limitation, the cement composition before capturing in an amount of carbon dioxide may be 100 kg, and, after capturing carbon dioxide, the composition may weight 102 kg, such that 2 kg of carbon dioxide was captured (i.e., 2 wt % relative to the mass of the composition prior to capturing carbon dioxide). In some embodiments, the composition captures greater than or equal to 0.1 wt %, greater than or equal to 0.2 wt %, greater than or equal to 0.3 wt %, greater than or equal to 0.5 wt %, greater than or equal to 1 wt %, greater than or equal to 2 wt %, greater than or equal to 3 wt %, greater than or equal to 4 wt %, or greater than or equal to 5 wt %, relative to the composition before it captured any carbon dioxide. In some embodiments, the composition captures less than or equal to 5 wt %, less than or equal to 4 wt %, less than or equal to 3 wt %, less than or equal to 2 wt %, less than or equal to 1 wt %, less than or equal to 0.5 wt %, less than or equal to 0.3 wt %, less than or equal to 0.2 wt %, or less than or equal to 0.1 wt %. Combinations of the above-referenced ranges are also possible (e.g., greater than or equal to 0.1 wt % and less than or equal to 5 wt %). Other ranges are possible.

In some embodiments, the compositions can capture a particular amount of carbon dioxide. For example, in some embodiments, the compositions are capable of capturing an amount of carbon dioxide greater than or equal to 0.1 wt %, greater than or equal to 1 wt %, greater than or equal to 2 wt %, greater than or equal to 3 wt %, greater than or equal to 4 wt %, or greater than or equal to 5 wt % relative to the mass of the composition prior to capturing carbon dioxide. In some embodiments, the compositions are capable of capturing an amount of carbon dioxide less than or equal to 5 wt %, less than or equal to 4 wt %, less than or equal to 3 wt %, less than or equal to 2 wt %, less than or equal to 1 wt %, or less than or equal to 0.1 wt % relative to the mass of the composition prior to capturing carbon dioxide. Combinations of the above-referenced ranges are also possible (e.g., greater than or equal to 1 wt % and less or equal to 5 wt % relative to the mass of the composition prior to capture carbon dioxide). Other ranges are possible.

In some embodiments, the concrete may react with carbon dioxide (e.g., the carbon dioxide reacts with at least one component of the composition). In some embodiments, the carbon dioxide may absorb and/or adsorb onto and/or into at least one component of the mixture (e.g., within a pore of the first material of the mixture). In some embodiments, water is added to the mixture to facilitate and/or promote curing.

In some embodiments, the method comprises mixing the mixture with portland cement (e.g., OPC) and/or other cementitious materials. However, in some embodiments, the method may exclude portland cement while including other cementitious materials and/or concrete-forming materials (e.g., concrete aggregates, paste, water).

In some embodiments, the mixture comprises microorganisms that help promote and/or catalyze the mineralization of carbon dioxide (e.g., within the pores of a first material of the cement or concrete mixture). In some embodiments, microorganisms in the mixture comprise bacteria of that Bacillus strain which may promote and/or accelerate the mineralization process of carbon dioxide (e.g., within the pores or a first material).

As shown in FIG. 1, the present invention may capture carbon dioxide directly from air within the concrete composition. One application of some embodiments described herein is to provide users with a concrete mixture that improves compressive strength while actively attracting, capturing, and/or mineralizing atmospheric carbon dioxide. Various embodiments may provide users with a process that provides negative emission technology with pozzolanic properties that may replace at least 5%, at least 10%, at least 20%, at least 30%, at least 40%, at least 50%, or at least 60% of cement (e.g., portland cement) in the concrete production process. By way of illustration (and not limitation), a typical concrete may require 100 kg of conventional (e.g., portland) cement, and the inventive cement compositions described herein may allow at least 60% of this conventional cement to be replaced. That is, up to 60 kg of conventional cement may be replaced with 60 kg of inventive cement as described herein and 40 kg of the conventional cement. In some embodiments, the concrete process may also comprise a gathering process, a mixing process, and a distribution process. Many of these components allow for the process to create a concrete composition that can reduce the amount of carbon dioxide from the surrounding environment. Thus, the present technology may be a negative emission technology with pozzolanic properties that replaces a portion of traditional OPC cement to produce a concrete that can capture and store carbon dioxide emissions. Waste glass and zeolite can be used due to their natural pozzolanic properties that aid in formation of concrete. Waste glass also helps mitigate the additional water for curing, as well as balance out the densities in the concrete caused by the other materials. In some embodiments, the waste glass can be augmented or replaced with a carbonate-containing compound, such as calcium carbonate. The calcium carbonate material may aid in the increase of strength of the cured cement mixture over time. It should be further noted that, the concrete mixture can be created in many proportions and main materials can be slightly altered as desired by the user.

The mixing process then takes the gathered materials and combines each one to create a concrete mixture as shown in FIG. 2. Once all the raw materials are properly ground up, each may be added to a mixture that includes a ready-mix concrete solution. In one embodiment, the mixture process uses 69-87% zeolite and basalt, 12-30% waste glass and/or calcium carbonate, and 1-3% titanium dioxide. In some embodiments, the basalt can be augmented or replaced by an amount of zeolite used within the composition. Advantageously, some basalt levels may improve the rate of carbon dioxide mineralization from the industry standard of hundreds to thousands of years to just a few years, greatly increasing the carbon dioxide capture efficacy of the concrete composition.

Figure 3:
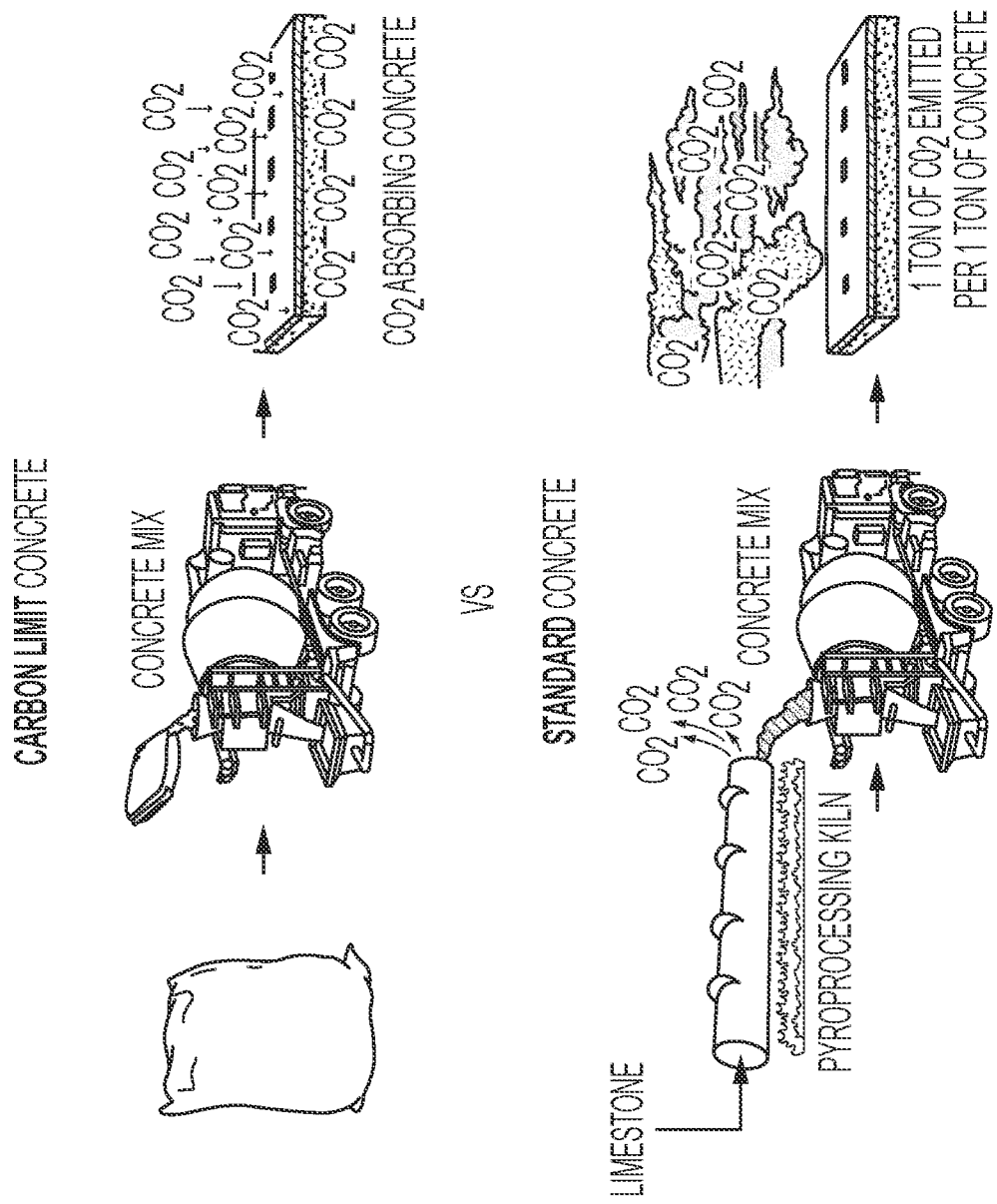
FIG. 3 is a diagram comparing carbon dioxide capture of some compositions described herein relative to certain existing concretes, according to some embodiments.

After the cement formula is mixed properly concrete aggregates, the distribution process is started, as shown in FIG. 3. With some other concrete mixtures in order to reduce the OPC requirement, carbon dioxide is injected during the concrete manufacturing process. However, with the cement and concrete compositions described herein, the concrete mixture is tailored so that after the cement is poured and cured, it actively attracts atmospheric carbon dioxide and mineralizes via carbonization into the concrete through chemical reaction and, hence, does not require further inputs of carbon dioxide. Further, in some embodiments, microorganisms (e.g., bacteria) can be added to the concrete mixture from, for example, the bacillus family of bacteria. The bacillus bacteria may act as a catalyst of mineralizing the carbon dioxide into the concrete structure (e.g., as a carbonate), forming, in some cases, a precipitated calcium carbonate sediment. The addition of the bacillus bacteria accelerates the mineralization process, for example, within the pores of the concrete. This results in a reinforced concrete composition and increased strength and repairing properties for the concrete mixture. With all the components working in tandem with each other, it can be seen that one application of the various embodiments described herein is a negative emission technology with pozzolanic properties that may replace traditional OPC cement to produce a concrete that can capture and store carbon dioxide emissions permanently.

Figure 10:
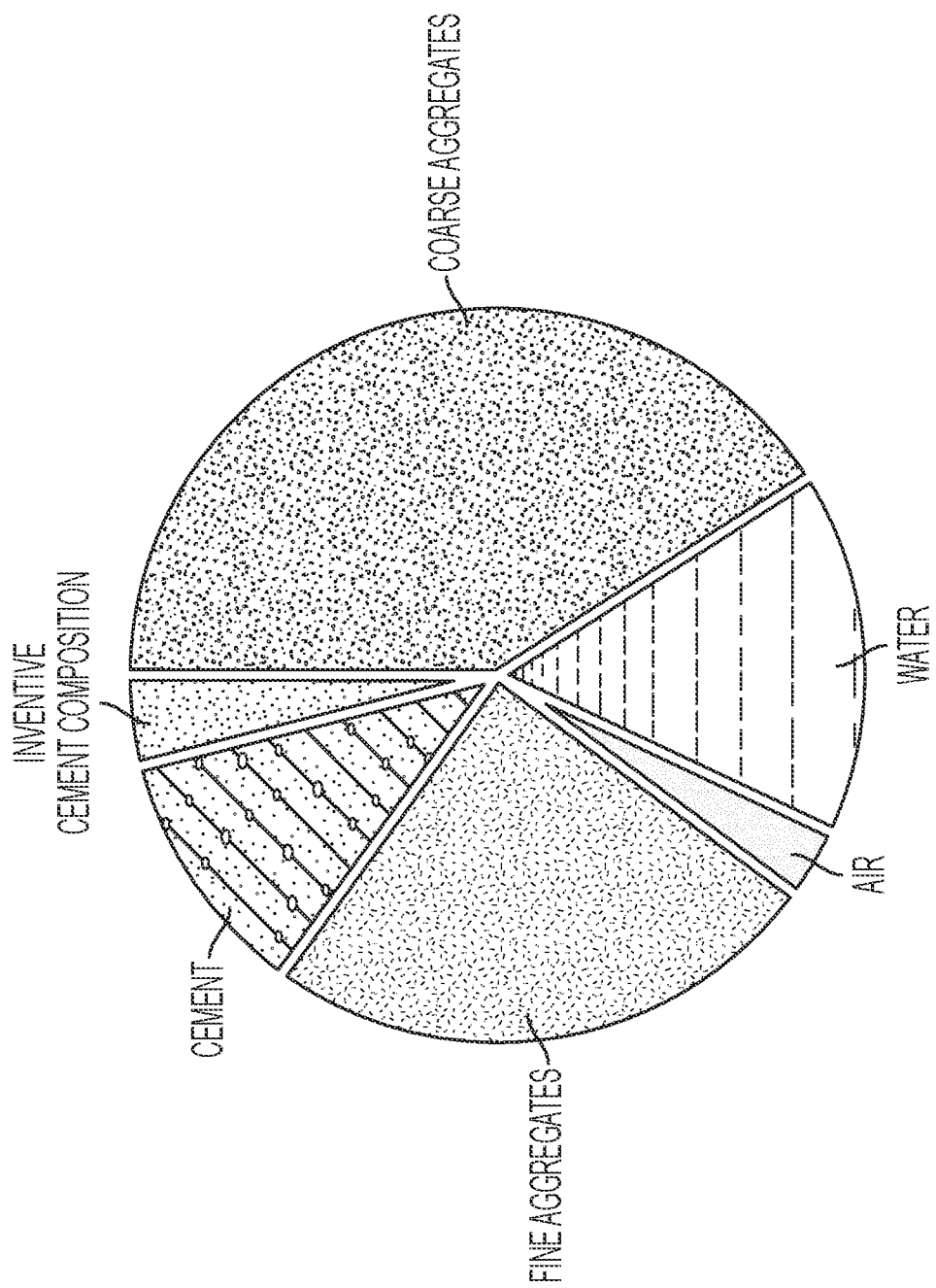
FIG. 10 is a schematic diagram of a concrete mixture comprising an inventive cement composition, according to some embodiments.

The cement and resulting concrete compositions can be used to fabricate carbon-capturing objects. For example, as described above, the cement and/or resulting concrete compositions are suited for capturing carbon dioxide from the ambient environment or from the atmosphere. The compositions can be formed into a variety of shapes and sizes suitable for a variety of purposes, including construction materials, buildings, sidewalks, roads, bridges, and the like. In some cases, the compositions can be formed into artistic articles such as monuments and/or statues. In some embodiments, the cement compositions may at least partially replace portland cement in concrete mixtures, shown in FIG. 10; however, in other embodiments, the cement compositions can be further mixed with portland cement.

Figure 12:
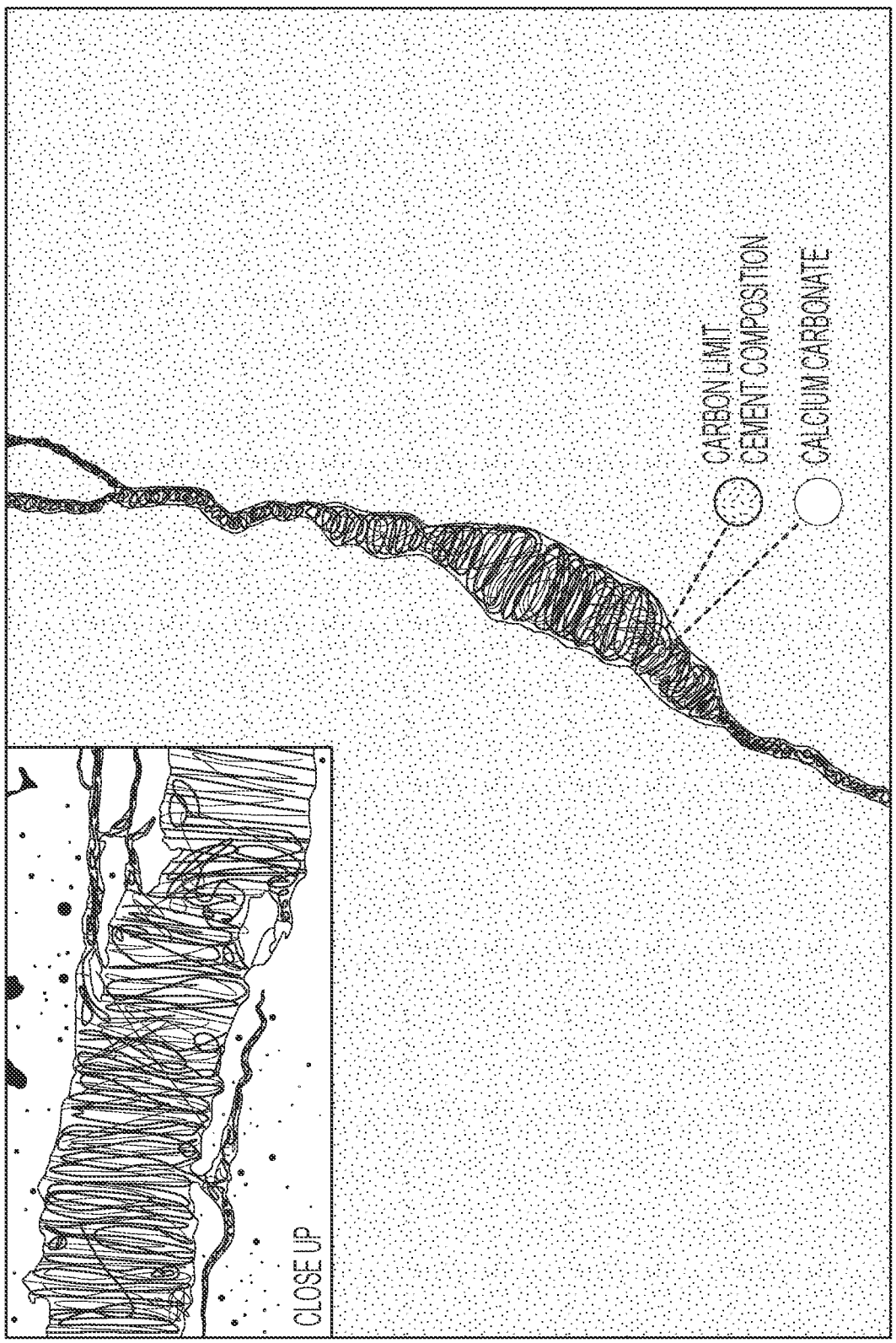
FIG. 12 is a schematic diagram of concrete comprising the inventive cement compositions repairing a crack to the concrete, according to some embodiments.

In some embodiments, the inventive cement compositions described herein or concrete comprising the inventive cement compositions described herein may be "self-healing," in that physical damage (e.g., cracks, breaks, tears) in the material may repair itself spontaneously (i.e., without the input of more than ambient surroundings). For example, in FIG. 12, concrete comprising an inventive cement composition has had damage done to its surface, forming a crack. As carbon dioxide is captured (i.e., by the inventive cement composition), it may mineralize within the cement forming, Sample 3. Therefore, the construction material described herein has comparable compressive strength and/or greater compressive strength than the control samples described above. As a result, the articles described herein may be considered as a suitable replacement for certain existing methods such as OPC.

TABLE 1

Compressive Strength of Select Compositions

|  | Sample 1 | Sample 2 | Sample 3 | Sample 4 |
|---|---|---|---|---|
|  |  | Composition |  |  |
|  | 80 wt % - Buzzi - Greencastle T1 (M4476) 20 wt % - Flyash | 20 wt % - Construction material described herein 80 wt % - Buzzi - Greencastle T1 (M4476) | 100 wt % - Buzzi - Greencastle T1 (M4476) | 5 wt % - Construction material described herein 95 wt % - Buzzi - Greencastle T1 (M4476) |
| Compressive Strength after 4 days [PSI] | 2905 | 3420 | 3210 | 3125 |
| Compressive Strength after 7 days [PSI] | 3390 | 3510 | 3940 | 3820 |
| Compressive Strength after 28 days [PSI] | 4320 | 4955 | 4600 | 4520 | e.g., calcium carbonate filaments within the crack that may reduce the structural impact of the crack on the concrete as a whole.

The following examples are intended to illustrate certain embodiments of the present invention, but do not exemplify the full scope of the invention.

EXAMPLE 1

The following example describes a cement composition that can sequester environmental carbon dioxide into calcium carbonate.

To demonstrate the carbon capture ability of the cement compositions, four cement compositions were prepared with the compositions shown in Table 1. Sample 1 and Sample 3 represent two existing compositions, acting as comparisons and comprising commercially available cementitious materials. Specifically, Sample 1 and Sample 3 comprise Buzzi-Greencastle T1(M4476) and a composition according to the present disclosure comprising 86.5 wt % zeolites, 13 wt % waste glass, and 0.5 wt % $TiO_2$. Sample 2 and Sample 4 represent two carbon-capturing cement compositions are described elsewhere herein. Sample 2 and Sample 4 have been incorporated into concrete composition at amounts of 20 wt % and 5 wt %, respectively. After the four samples were hydrated and cured, the compressive strength of each sample was tested after 4 days, 7 days, and 28 days. After 4 days, Sample 2 had a higher compressive strength than both comparison samples, while Sample 4 had a higher compressive strength than Sample 1 and 97% of the compressive strength of Sample 3. After 7 days, Sample 2 had a higher compressive strength than Sample 1 and 89% of the compressive strength of Sample 3, while Sample 4 had a higher compressive strength than Sample 1 and 96.9% of the compressive strength of Sample 3. After 28 days, Sample 2 had a higher compressive strength than both control samples, while Sample 4 had a higher compressive strength than Sample 1 and 98% of the compressive strength of An amount of $CO_2$ absorption of the composition was compared to certain existing articles, such as commercially available cementitious materials. Two test samples of the compositions and two control samples of commercially available cementitious material were finely ground into a powder, and 5 g of the resulting powder was exposed to a $CO_2$ environment at 25° C. The mass gain of the powder was measured to determine the amount of absorbed $CO_2$. The samples of the construction material described herein experienced an average 1.93% mass gain from absorbed $CO_2$ compared to the control samples which had an average mass gain of 0.71% $CO_2$ after 3 days. After 7 days, the control samples had a mass gain of 0.33% while the test samples experienced an average 2.37% mass gain. After 28 days, the control samples had a mass gain of 0.45% while the test samples experienced an average 1.5% mass gain. The carbon-capturing compositions were, therefore, capable of absorbing more $CO_2$ than the control sample.

Figure 4:
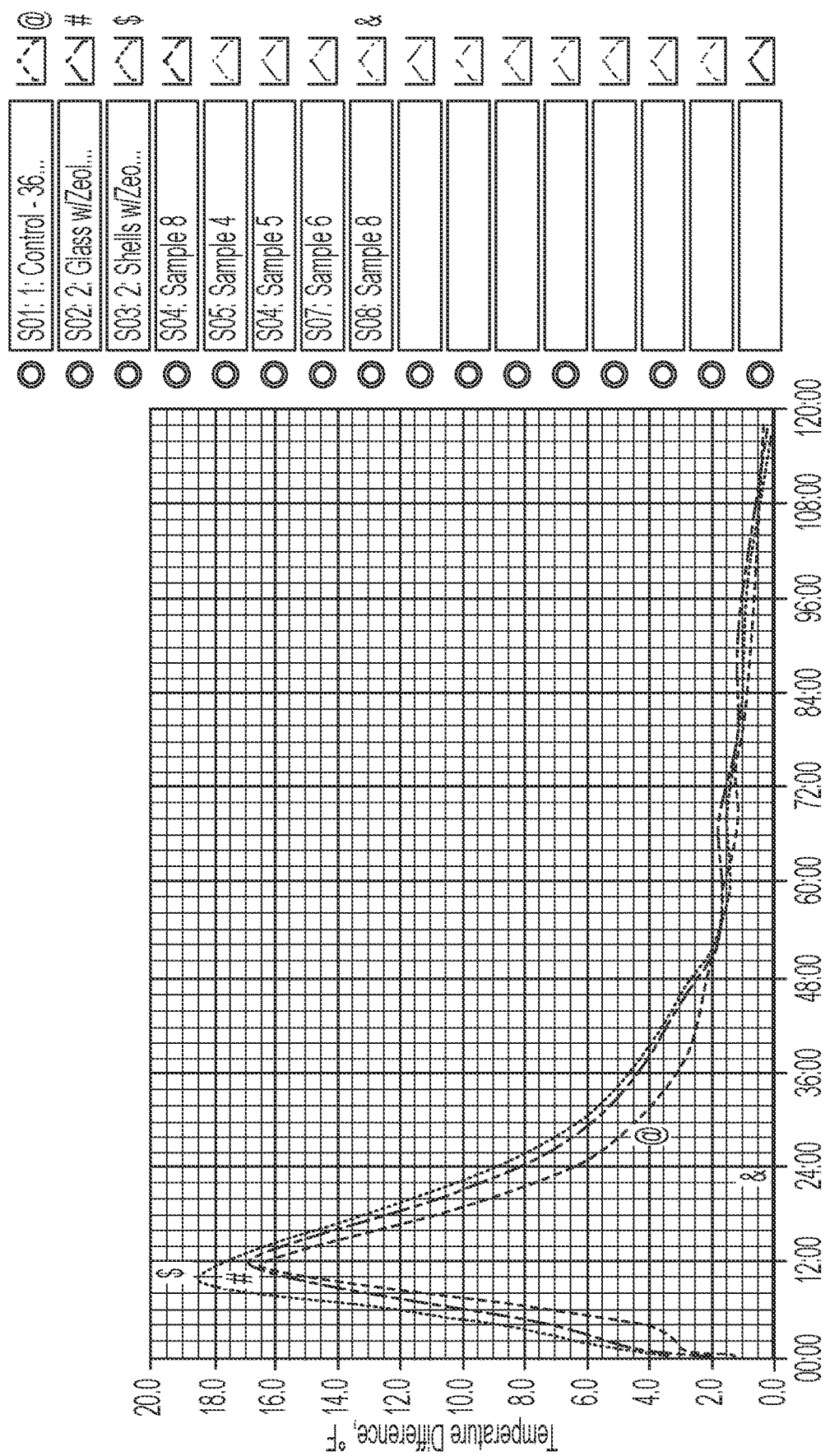
FIG. 4 is a plot that depicts that temperature change over 5 days of four different cement compositions where the control sample and the sample with glass and zeolite experienced a peak temperature change of 16° F. while the sample with zeolites and shells experienced a peak change of 18.5° F., according to some embodiments.
Figure 6:
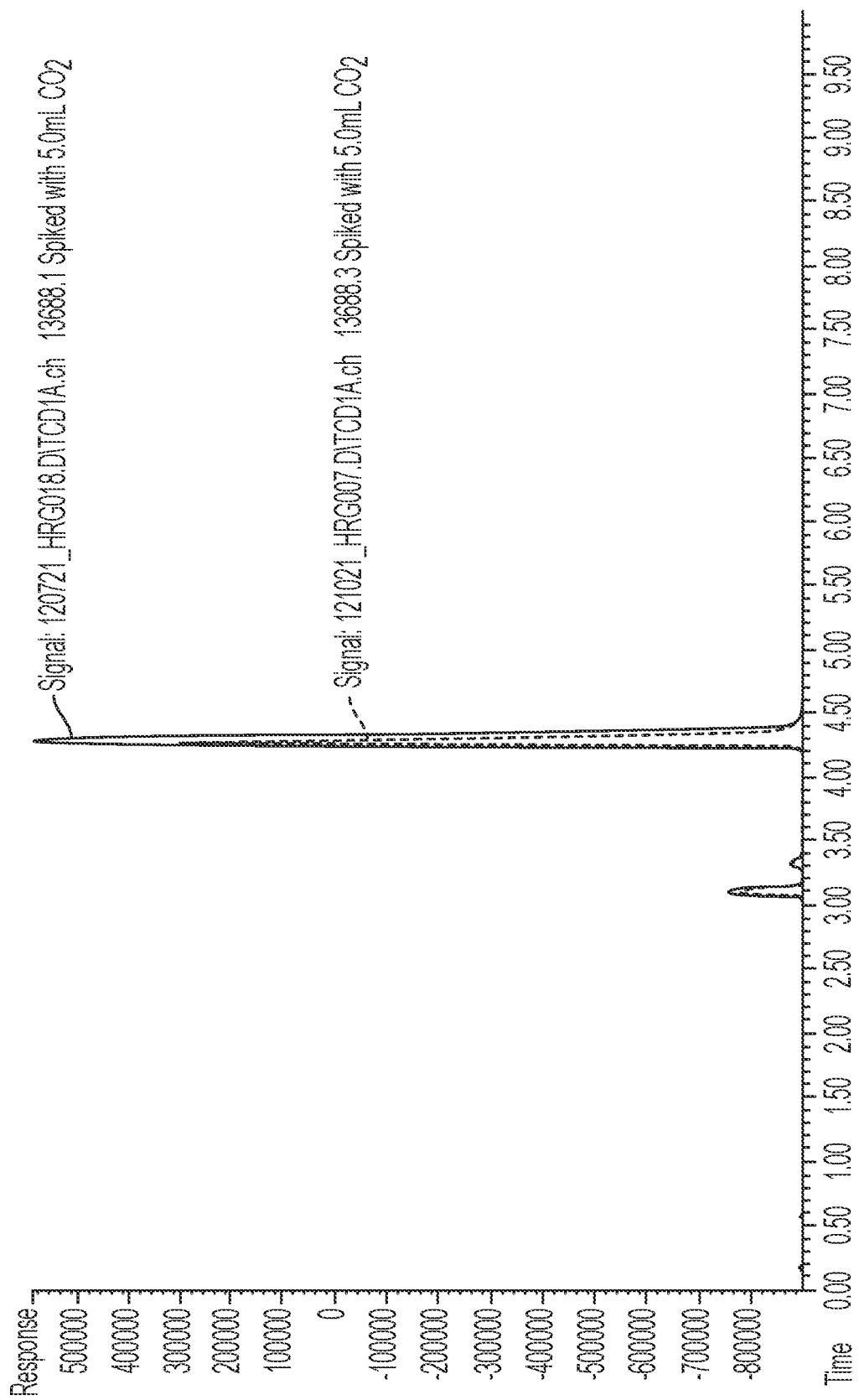
FIG. 6 is a gas chromatograph depicting the relative absorption rates of $CO_2$ for a sample of commercially available cementitious materials and a sample of the carbon-capturing cement compositions as described herein, according to some embodiments.
Figure 7:
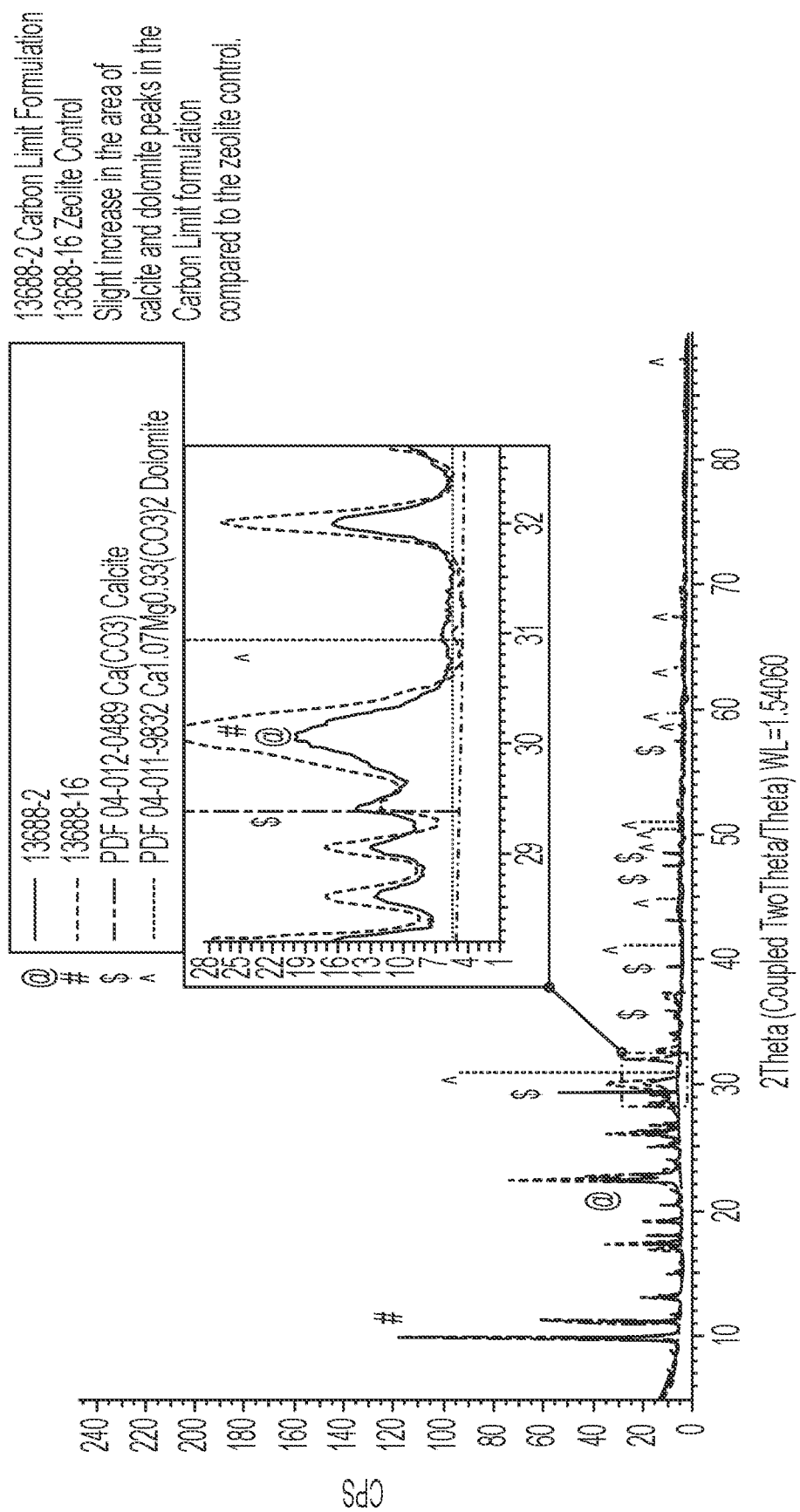
FIG. 7 is an x-ray diffraction spectrum depicting the variations in crystal structure between a zeolite sample and a sample of the cement compositions described herein, according to some embodiments.
Figure 8:
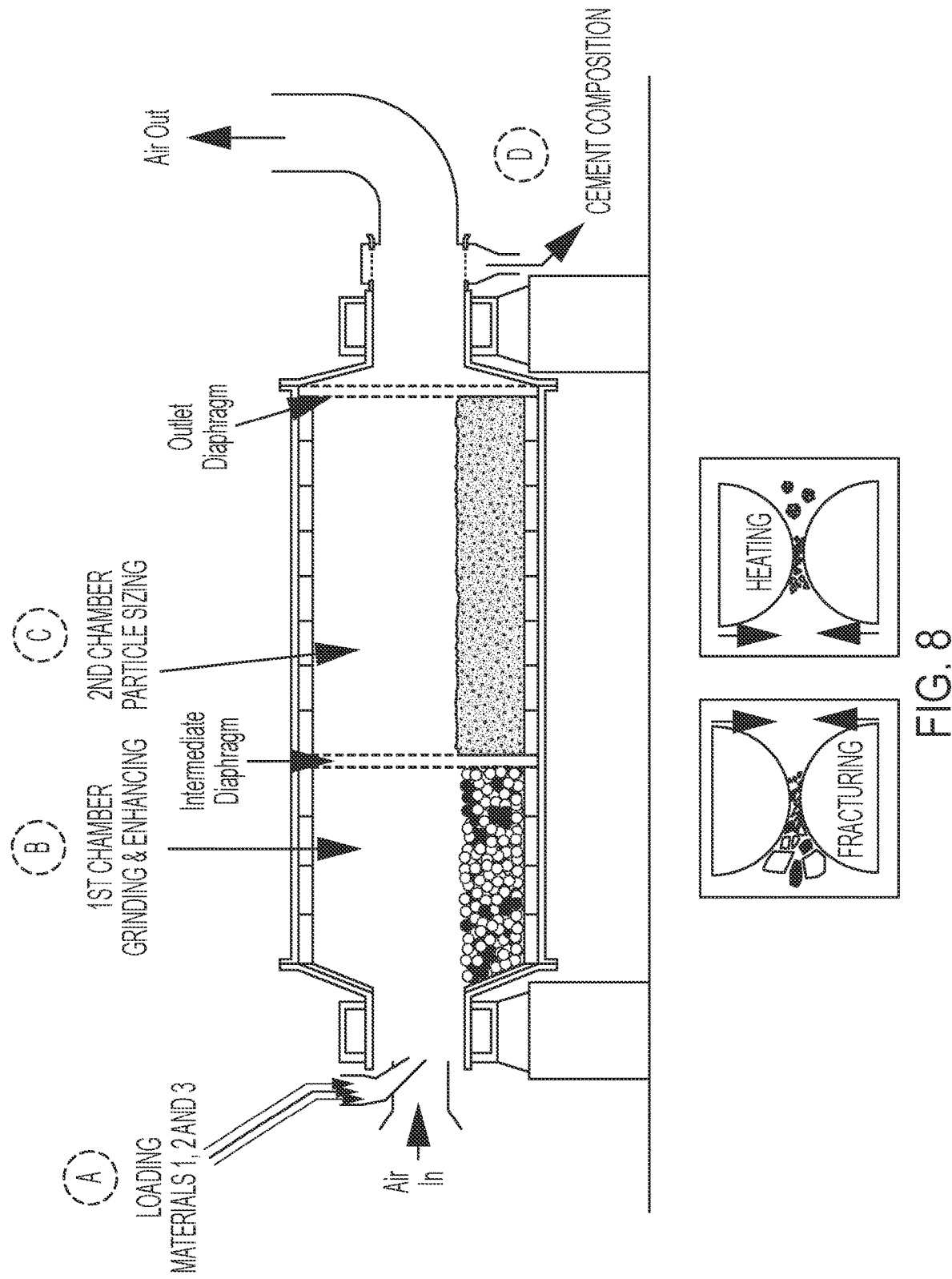
FIG. 8 is a schematic diagram showing loading of a first material, a second, and a third material into a grinding apparatus, where the materials may be further enhanced, e.g., via fracturing and/or heating, according to some embodiments.

The rate of carbon dioxide uptake was also measured via gas chromatography. A sample of the composition (labeled as "136881.1" in FIG. 4) was spiked with increasing amounts of carbon dioxide, but a $CO_2$ peak was not observed as shown in FIG. 4, indicating the sample was absorbing carbon dioxide. A control concrete sample comprised of Buzzi-Greencastle T1 was also spiked with carbon dioxide, and the spectrum did show a carbon dioxide peak indicating less absorption of carbon dioxide. The rate of carbon dioxide uptake is observed to be higher for inventive compositions relative to the commercially available sample.

The increased mass of calcium carbonate was also measured to determine the degree of sequestration that has occurred. Without wishing to be bound by any particular theory, it is believed the captured $CO_2$ chemically reacts with calcium hydroxide to form calcium carbonate. Powder samples of the construction material and control samples were treated with 18 mL of 0.5 N HCl and diluted with 100 mL $H_2O$. A portion of the HCl is consumed when it reacts with the calcium carbonate in each sample. After each sample was stirred for at least one hour, each sample was back-titrated with 1 N NaOH to determine the amount of HCl that was consumed by the sample. It was then possible to determine the total carbonate content of the sample to examiner carbon dioxide mineralization, and this procedure was verified on a sample of pure calcium carbonate. The inventive cement compositions had 1.19× more $CaCO_3$ content than would have been predicted based on the pure calcium carbonate comparison sample X-ray diffraction data shown in FIG. 5 depicts the crystal structure of a test sample of the inventive cement compositions and a control sample comprising zeolite. An increase in the area of the calcite and dolomite peaks were observed in the test sample relative to the control sample.

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of" "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method of capturing carbon dioxide, the method comprising:
    capturing carbon dioxide from an ambient environment using a solid material comprising a cement composition, the cement composition comprising:
        a first material comprising a porous zeolite;
        a second material comprising silica and/or a carbonate compound; and
        a third material comprising a metal oxide.

2. The method of claim 1, wherein the first material comprises a pozzolanic material.

3. A method of capturing carbon dioxide, the method comprising:
 capturing carbon dioxide from an ambient environment using a solid material comprising a cement composition, the cement composition comprising:
  a first material comprising a porous mafic mineral;
  a second material comprising silica and/or a carbonate compound; and
  a third material comprising a metal oxide.

4. The method of claim 1, wherein a porosity of the first material is greater than or equal to 20% and less than or equal to 80%.

5. The method of claim 1, further comprising forming the cement composition by mixing together the first material, the second material and the third material.

6. The method of claim 5, adding the cement composition to a concrete-forming composition to form concrete, wherein the concrete captures carbon dioxide.

7. The method of claim 6, further comprising curing the concrete.

8. The method of claim 6, wherein the concrete comprises portland cement.

9. The method of claim 6, wherein the concrete has greater than or equal to 0.01 wt % and/or less than or equal to 15 wt % of the first material, the second material, and/or the third material.

10. The method of claim 1, further comprising combining a first plurality of particles comprising the first material with a second plurality of particles comprising the second material and a third plurality of particles comprising the third material to form the cement composition.

11. The method of claim 10, wherein the first plurality of particles and/or the second plurality of particles and/or the third plurality of particles has an average particle size of less than or equal to 100 microns.

12. The method of claim 1, wherein the cement composition captures carbon dioxide by reacting at least one component of the cement composition with carbon dioxide.

13. The method of claim 1, wherein the cement composition captures carbon dioxide by adsorbing and/or absorbing carbon dioxide.

* * * * *